United States Patent
Toby

[11] 3,751,873
[45] Aug. 14, 1973

[54] ACCUMULATING AND DISTRIBUTING CONVEYOR FOR FOOD PRODUCTS

[75] Inventor: Edward P. Toby, South San Francisco, Calif.

[73] Assignee: Toby Entrprises, South San Francisco, Calif.

[22] Filed: Apr. 10, 1972

[21] Appl. No.: 242,299

[52] U.S. Cl. .................................. 53/59 R, 198/34
[51] Int. Cl. ............................................. B65b 57/10
[58] Field of Search ....................... 53/59 R; 198/34

[56] References Cited
UNITED STATES PATENTS

| | | | |
|---|---|---|---|
| 2,995,881 | 8/1961 | Luczek et al. .................. | 53/59 R X |
| 3,332,819 | 7/1967 | Siempelkamp .................... | 198/34 X |

*Primary Examiner*—Travis S. McGehee
*Attorney*—Harris Zimmerman

[57] ABSTRACT

An accumulating and distributing mechanism is described for delivering stacks of sliced meat from a meat slicing machine to a packaging machine at a controlled rate irrespective of random fluctuations in the rate at which the stacks are furnished from the slicing machine. The mechanism includes a pair of conveyors which are coextensive with one another over a portion of their lengths and which mesh at a point of intersection for transference of the stacks from one to the other. A first one of the conveyors receives the stacks sequentially from the slicing machine and delivers the same to the second conveyor which, in turn, delivers such stacks to the packaging machine. A carriage establishes the intermeshing intersection of the two conveyors and is movable longitudinally along their coextensive lengths to longitudinally vary the position of such intersection. The carriage is moved under the control of a product detection system which senses gaps in produce flow along the first conveyor. When such a gap is sensed, the carriage moves the point of intersection in the direction of flow of the product to a location relative to the second conveyor so that the next stack which is transferred from the first conveyor to the second is placed thereon at the proper location. The speed of the first conveyor is substantially increased during such time to hasten the transfer of such next stack to the second coneyor. When the next stack is transferred, carriage movement is reversed and if continuous product flow is sustained the carriage continues to move in the reverse direction to a normal home position, and the speed of the first conveyor is restored to normal. In this manner gaps in the supply product flow along the first conveyor do not appear in the demand product flow along the second conveyor.

10 Claims, 14 Drawing Figures

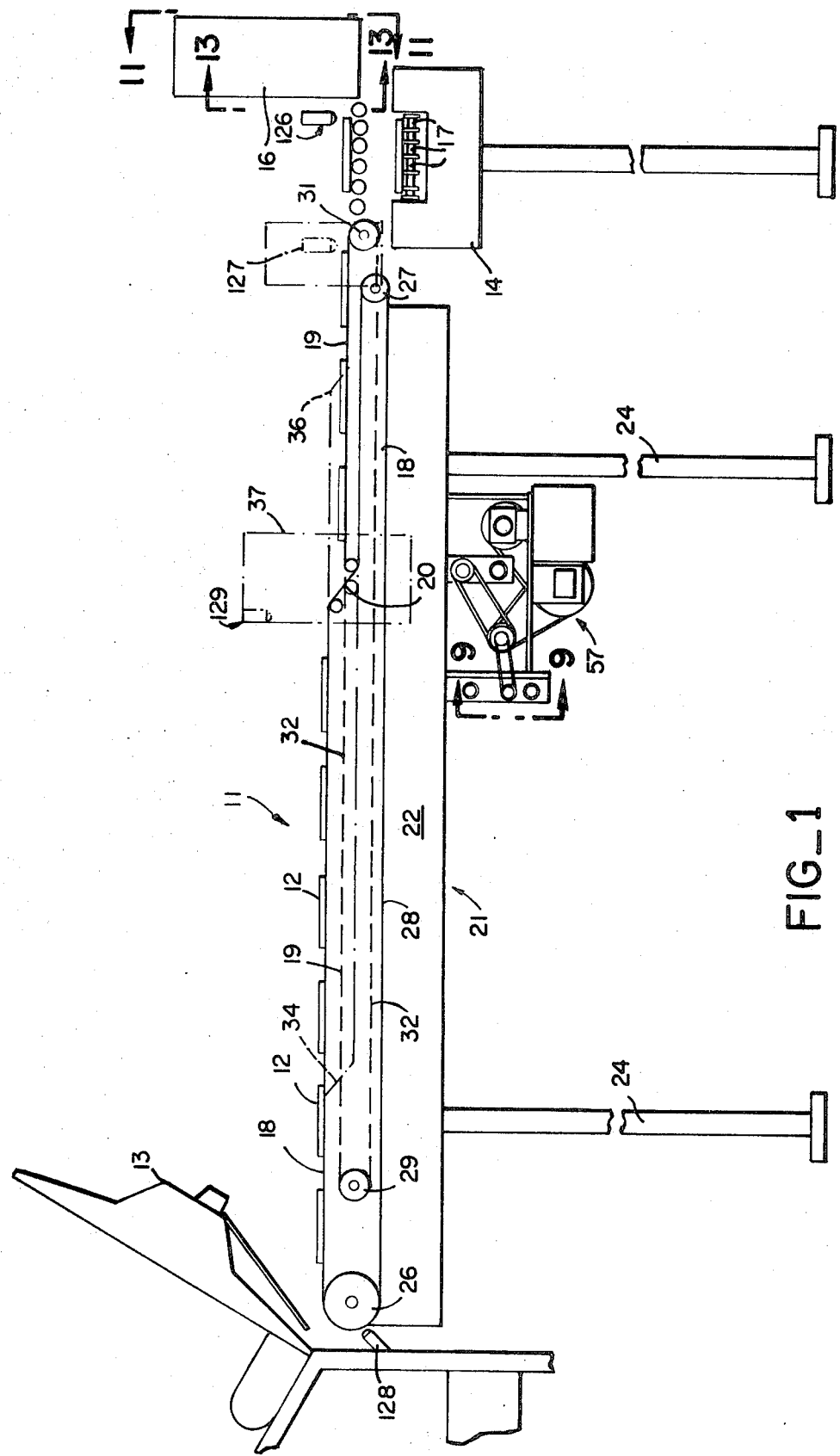
FIG_1

Patented Aug. 14, 1973
3,751,873
7 Sheets-Sheet 2
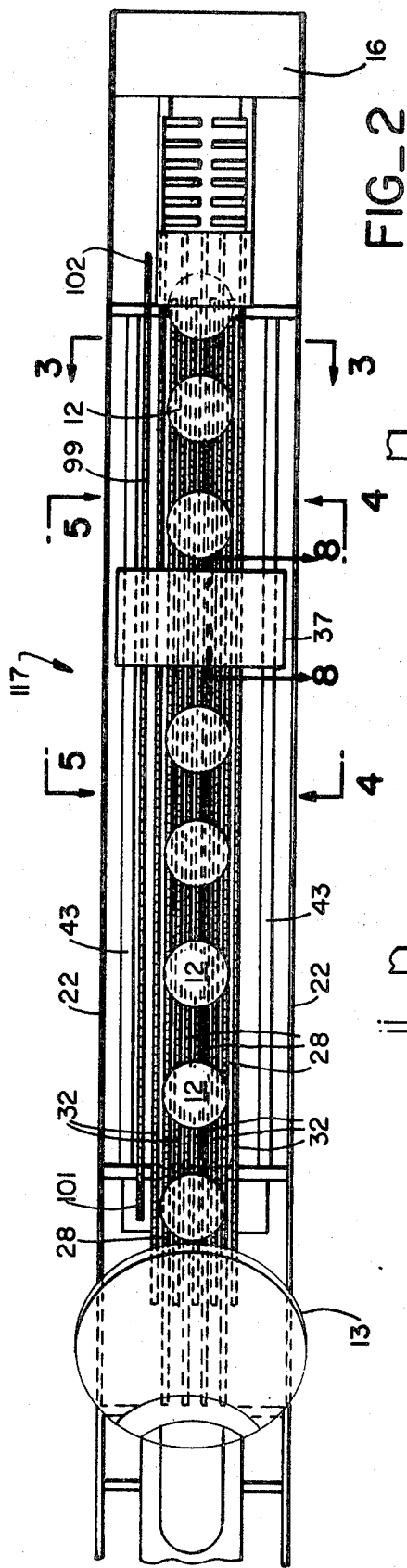
FIG_2
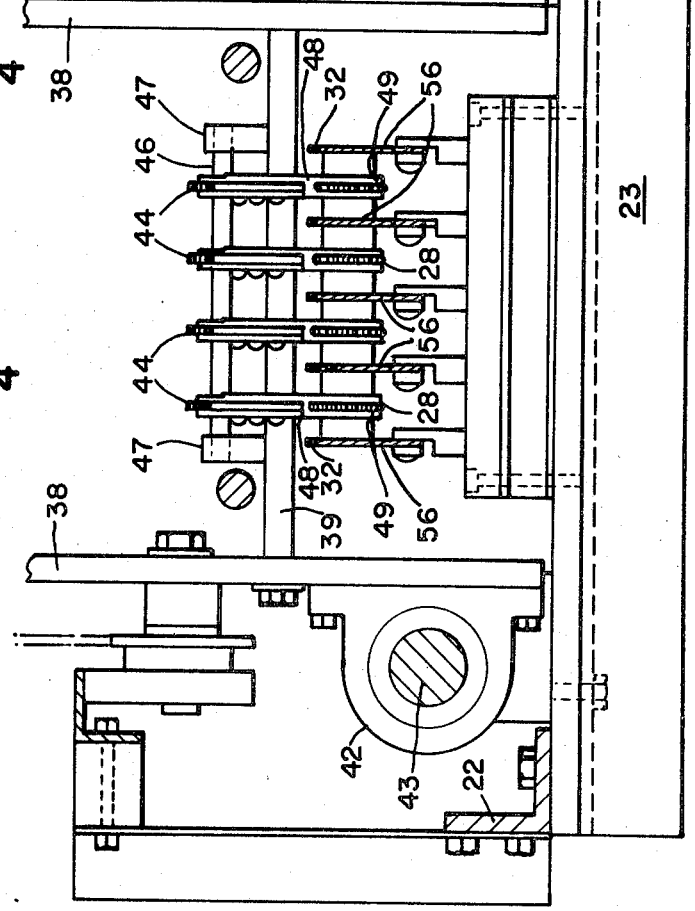
FIG_3

Patented Aug. 14, 1973
3,751,873
7 Sheets-Sheet 3
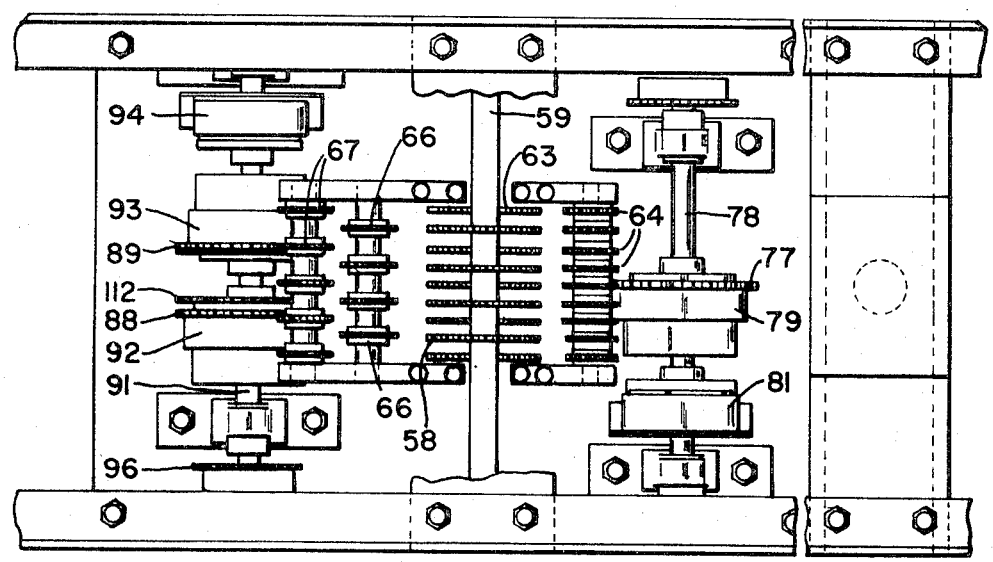
FIG_7
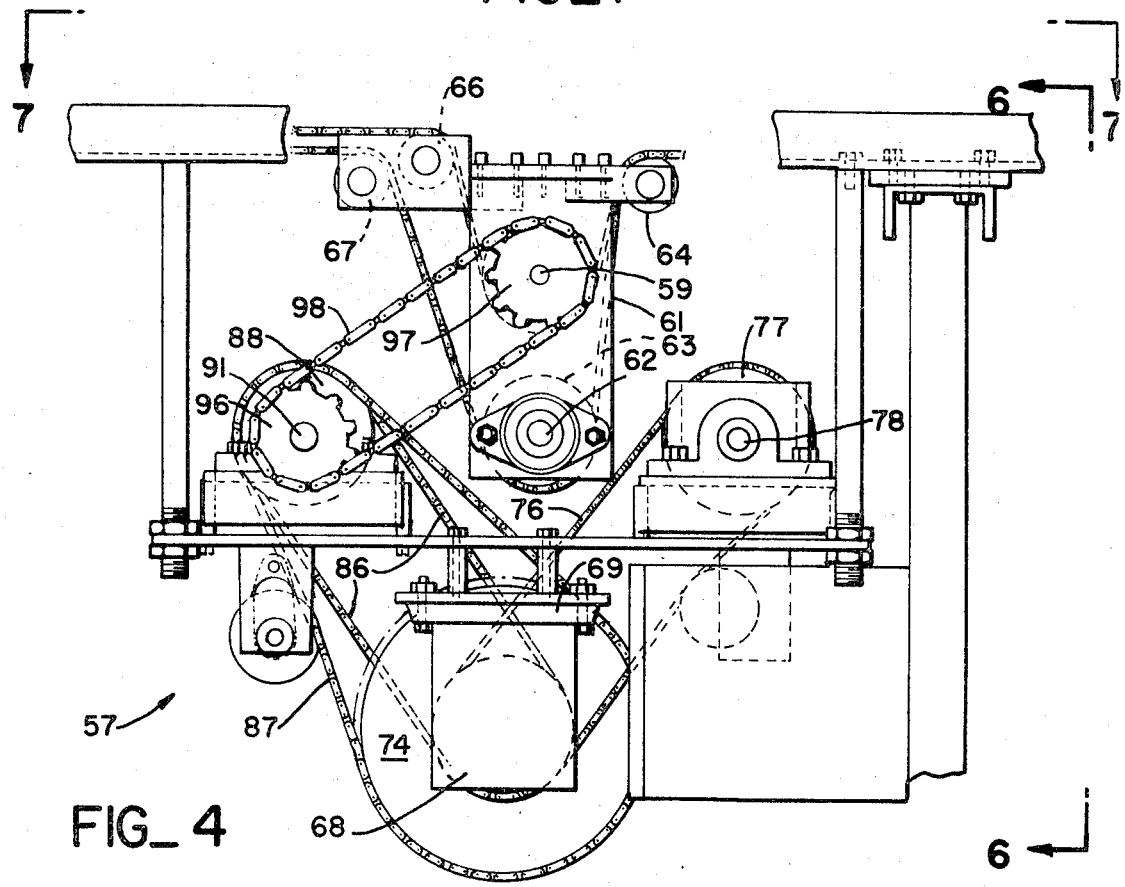
FIG_4

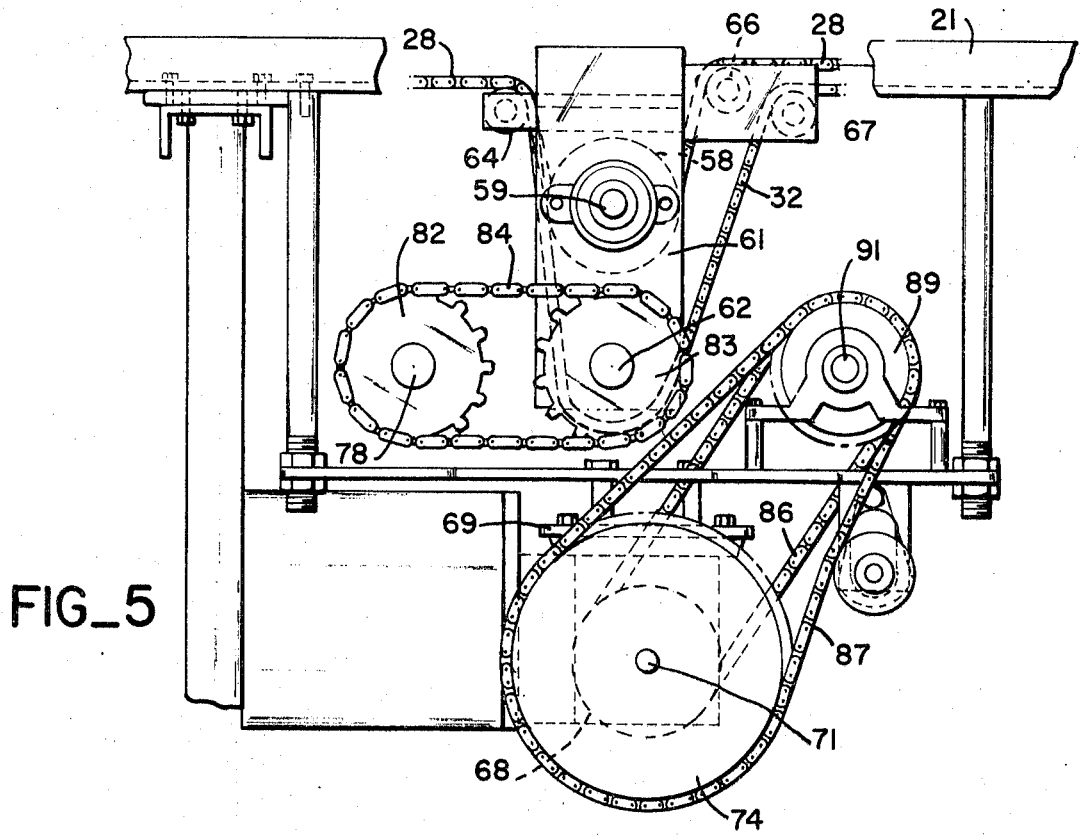
FIG_5
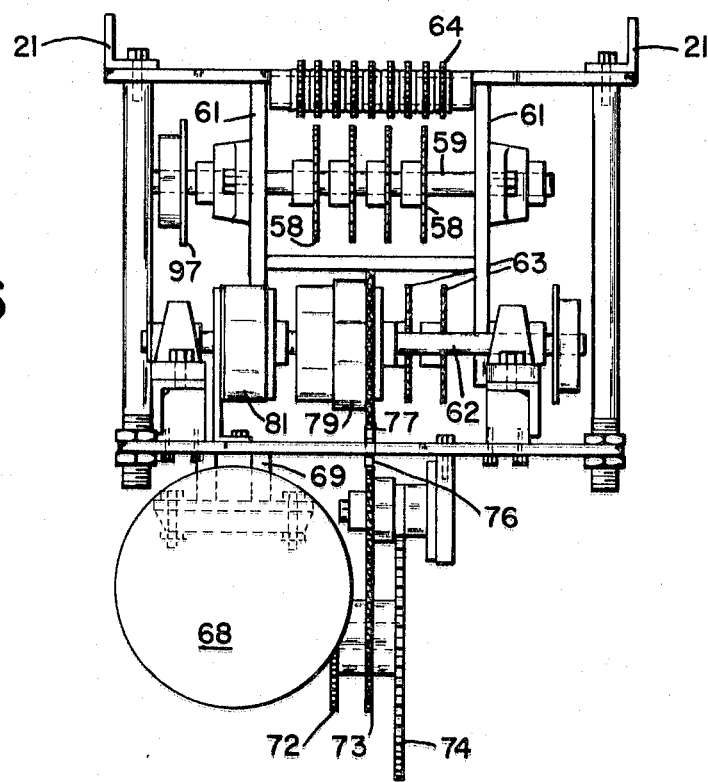
FIG_6

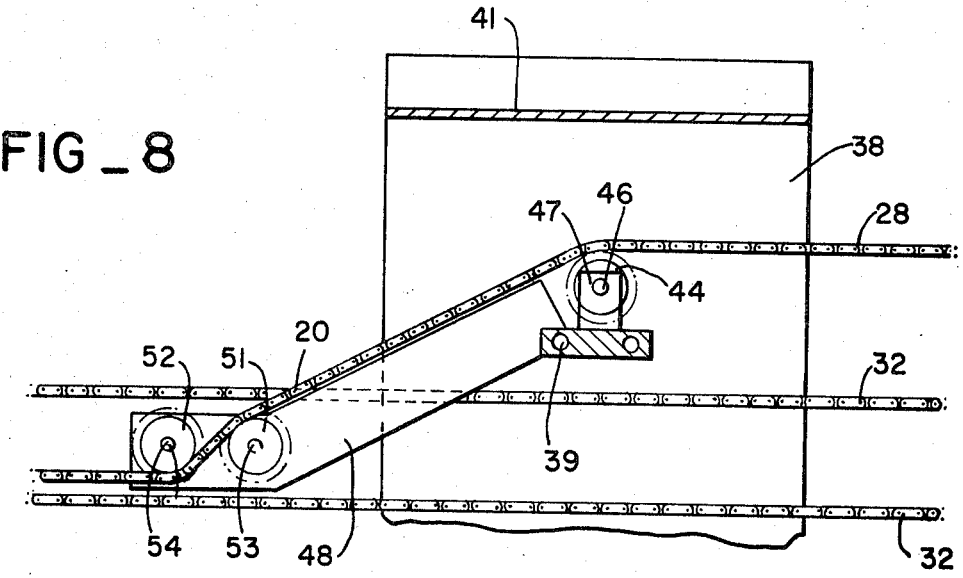
FIG_8
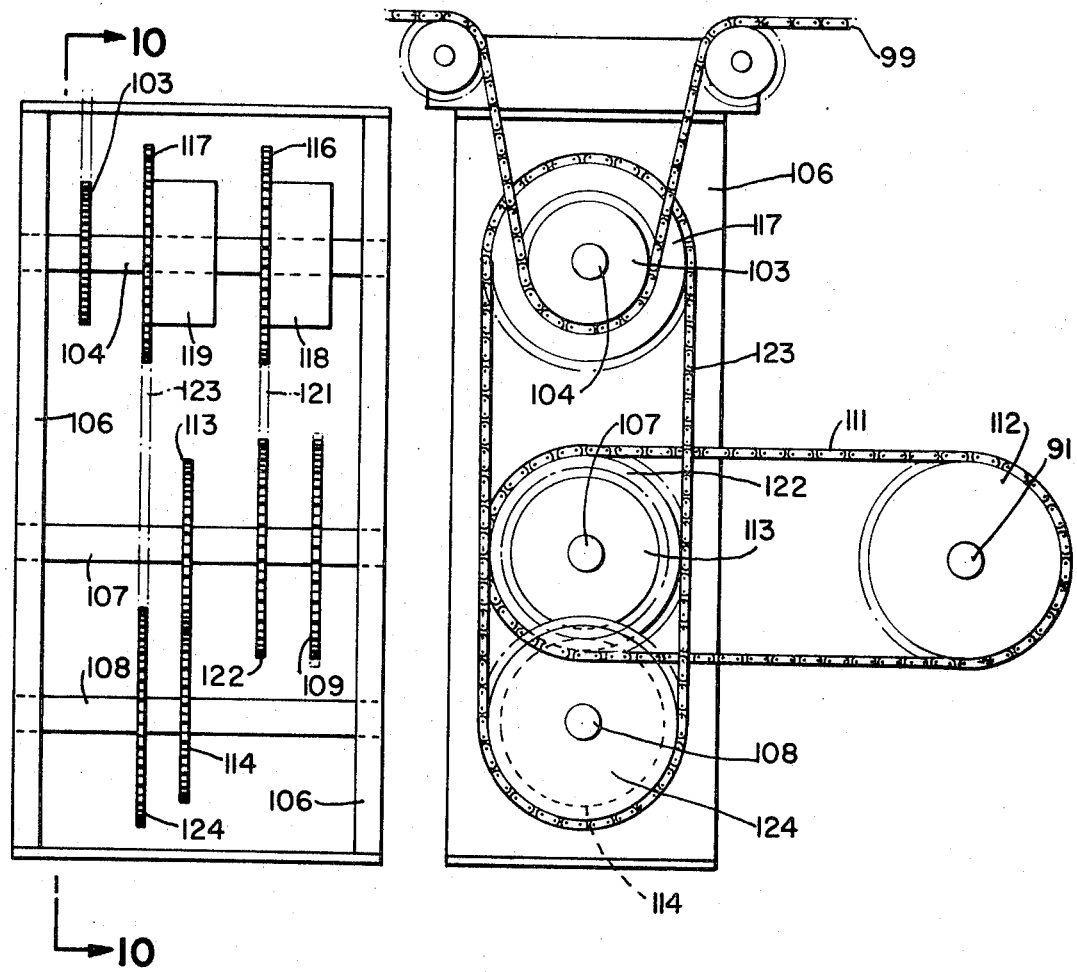
FIG_9   FIG_10

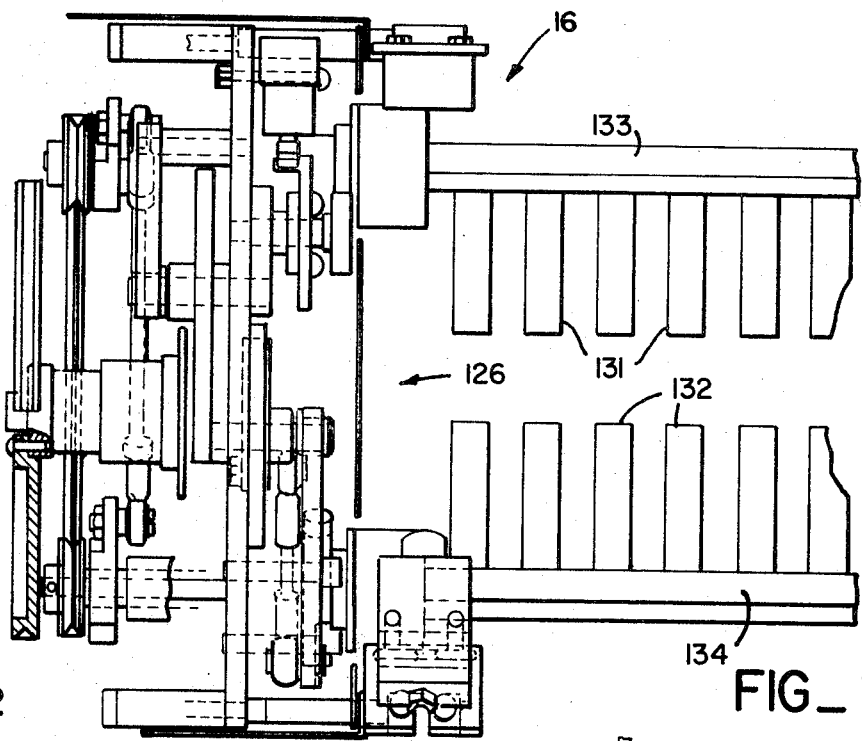
FIG_14
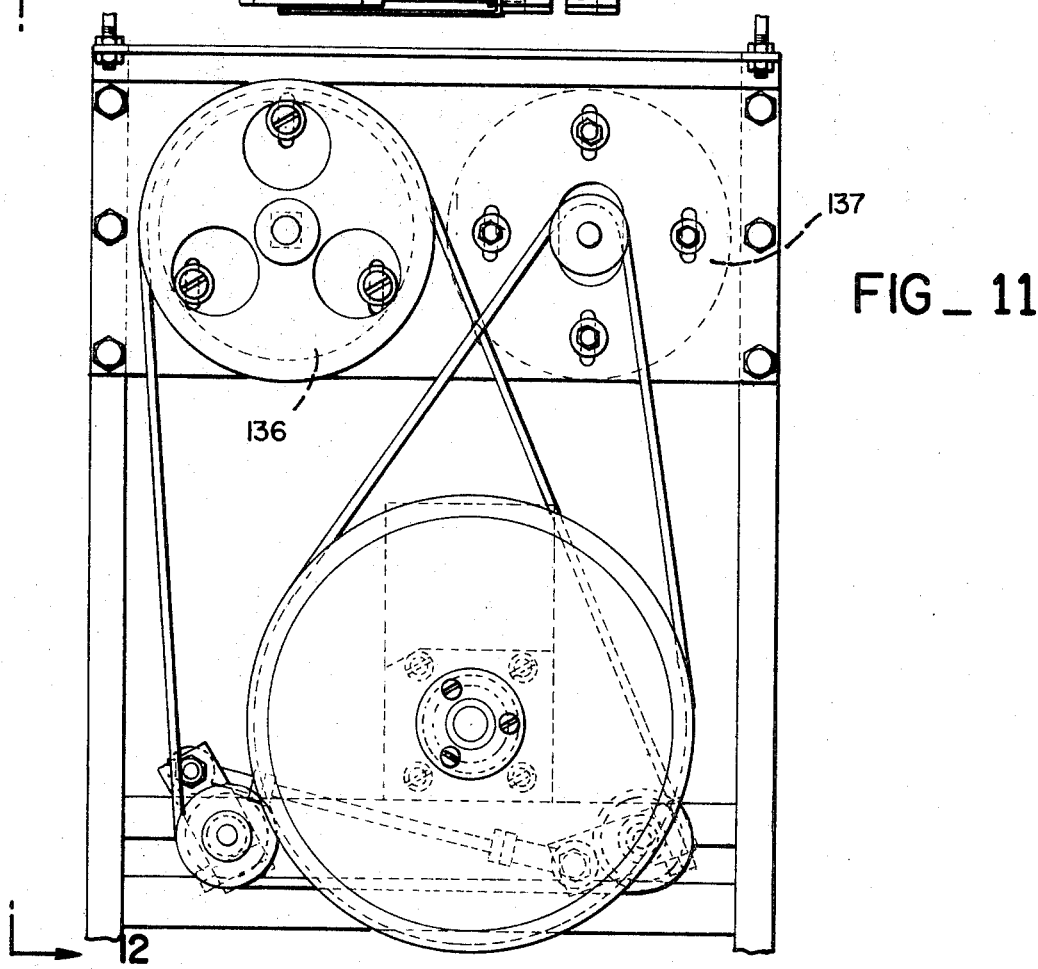
FIG_11

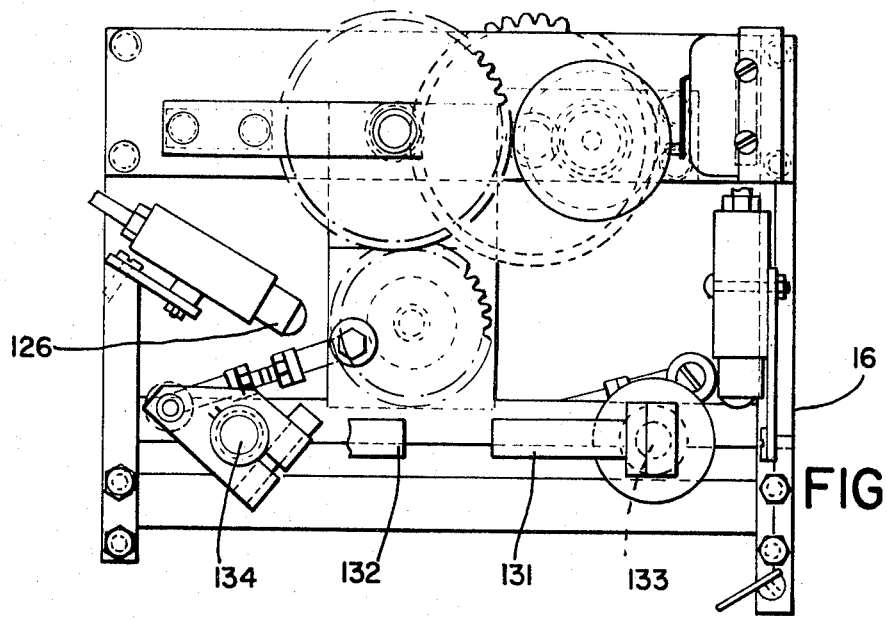
FIG_13
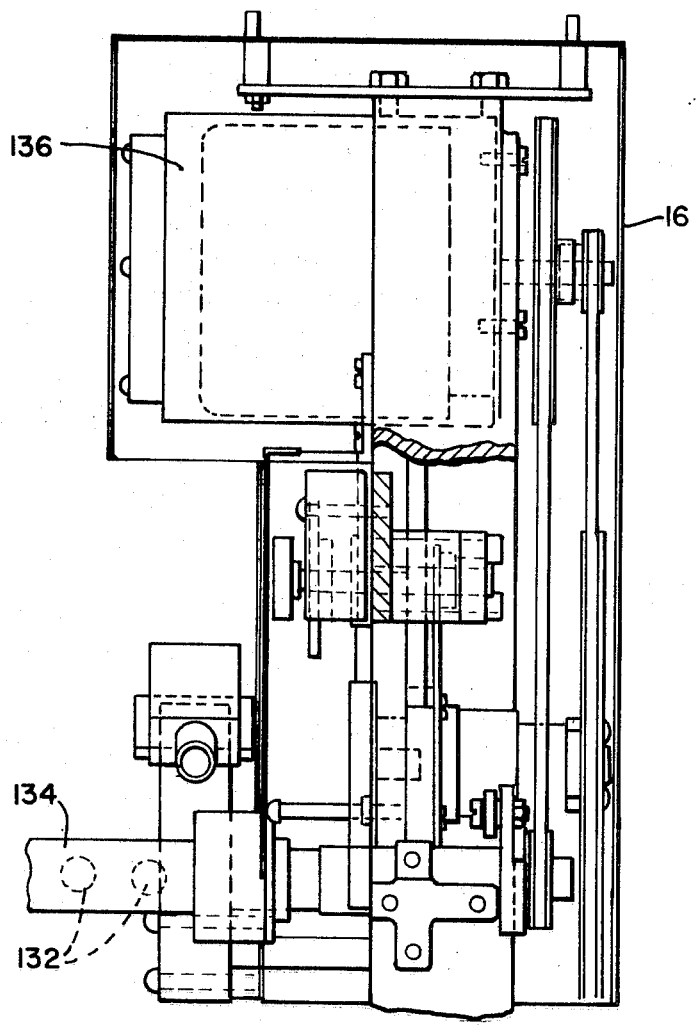
FIG_12

ACCUMULATING AND DISTRIBUTING CONVEYOR FOR FOOD PRODUCTS

BACKGROUND OF THE INVENTION

The present invention relates to mechanism for delivering objects from an object supplying mechanism to an object demanding mechanism at a controlled rate irrespective of random fluctuations in the rate at which the objects are provided by the object supplying mechanism and irrespective of limited speed variation in the object demanding mechanism.

It is common in the processing field for a product or object being processed to be sequentially processed by two different mechanisms. For example, in the processing of meat for the production of packaged meat slices, a meat slicing machine may first produce stacks of meat slices which are delivered to a packaging machine for packaging. For efficient operation, the output or supply of sliced meat from the slicing machine must be matched with the speed of the packaging machine. However, the output from the slicing machine is apt to fluctuate with the result that the packaging machinery is supplied either too fast or too slow. The fluctuations in the supply of sliced meat from the slicing machine may occur, for example, by virtue of the slicing machinery being equipped with automatic weighing devices designed to reject off-weight stacks such that somewhat random gaps in product flow, both in frequency and duration, result. Similarly, when the slicer is reloaded with unsliced meat, short gaps in product flow occur while the new loaf moves into slicing position.

Heretofore, the usual practice to compensate for mismatching of supply and demand has involved a human operator who manually transfers stacks of meat from the slicer to the packaging machine. Such operator piles stacks in excess of the demand of the packaging machine to one side and draws from this pile when supply lags. Attempts to solve the problem by linking the speed of one machine to that of the other have not proved practical because of the elaborate and costly mechanical or electrical linkage necessary to accomplish the matching. Previous attempts to develop an automatic accumulator-distributor arrangement for this purpose have also proven unsuccessful, primarily because they have entailed the use of a mechanical gate or the like to meter flow of product resting on a continuously moving conveyor. This has resulted in relative motion between the product and conveyor which, while being tolerable in the accumulation and distribution of rigid objects such as tin cans, boxes or the like, is undesirable where a food product, such as sliced meat, is involved because of its soft, fragile nature.

SUMMARY OF THE INVENTION

The present invention is an accumulating and distributing mechanism for delivering objects from an object supplying mechanism to an object demanding mechanism at a controlled rate irrespective of random fluctuations in the rate at which the objects are supplied by the object supplying mechanism, and irrespective of limited speed changes in the object demanding mechanism. More particularly, the invention relates to such an accumulating and distrbuting mechanism which is particularly useful in providing a controlled rate of flow between two processing mechanisms when the objects being processed are of a fragile nature, such as thin slices of meat. In its basic aspects, the invention includes a pair of intersecting conveyors for sequentially transporting the objects between the supplying mechanism and the demanding mechanism. A first one of the conveyors receives the objects from the suppling mechanism and transfer them to the second one of the conveyors at the point at which the conveyors intersect. The second conveyor then delivers the objects to the object demanding mechanism.

Means are provided for detecting a gap or break in the desired product flow on the first conveyor which would normally result in an undesired fluctuation in the rate at which the products are delivered to the demanding mechanism. As a particularly salient feature of the invention, it further includes means responsive to the detection of such a gap or break by moving the point at which the conveyors intersect in the direction of flow of such objects to a new location at which the next object transferred from the first conveyor to the second conveyor will be positioned on such second conveyor at a spacing thereon representative of the desired rate of product flow. The fluctuation in product flow which is thus sensed on the first conveyor is corrected upon the product being transferred to the second conveyor so that the desired controlled product flow is maintained at the input of the object demanding mechanism. After the fluctuation is corrected in this manner, the point of intersection of the two conveyors is returned to its original location.

It will be seen from the above that the desired controlled rate of delivery of the objects to the object demanding mechanism is achieved without the use of elaborate speed matching and control linkage of one sort or another. Moreover, because the product is delivered from one moving conveyor to another at their point of intersection, the use of mechanical gates and the like which may injure a product by reason of bunching together of product, or relative motion between the gates and conveyor, is avoided.

The invention includes other features and advantages which will be described or will become apparent from the following detailed description of a preferred embodiment.

THE DRAWINGS

With reference to the accompanying seven sheets of drawings:

FIG. 1 is a side elevational view, partly in schematic, of a preferred embodiment of an accumulating and distributing mechanism of the present invention situated between meat slicing amd packaging means, partially shown;

FIG. 2 is a plan view of the showing in FIG. 1;

FIG. 3 is an enlarged sectional view taken on a plane indicated by line 3—3 of FIG. 2;

FIG. 4 is an enlarged fragmentary side elevational view taken from a direction indicated by line 4—4 of FIG. 2, and illustrating the drive system for the accumulating and distributing mechanism;

FIG. 5 is an enlarged and fragmentary side elevational view taken from a direction indicated by line 5—5 of FIG. 2, illustrating further details of the drive system;

FIG. 6 is an enlarged sectional view taken from a plane indicated by line 6—6 of FIG. 4;

FIG. 7 is an enlarged fragmentary view taken in a direction indicated by line 7—7 of FIG. 4;

FIG. 8 is an enlarged sectional view taken on a plane indicated by line 8—8 of FIG. 2, particularly illustrating the distributor carriage of the preferred embodiment of the mechanism;

FIG. 9 is a sectional view on an enlarged scale taken on a plane indicated by line 9—9 of FIG. 1, particularly illustrating the drive system for the distributor carriage;

FIG. 10 is an enlarged and partial sectional view taken on a plane indicated by line 10—10 of FIG. 9;

FIG. 11 is a fragmentary and enlarged end view, taken in the direction of the plane indicated by line 11—11 of FIG. 1, of a stack dropping device employed intermediate the conveyor arrangement and the packaging machine;

FIG. 12 is an enlarged side elevational view of the dropping device taken from a plane indicated by line 12—12 of FIG. 11;

FIG. 13 is an enlarged, fragmentary end view of the dropping device taken from a plane indicated by line 13—13 of FIG. 1; and FIG. 14 is an enlarged and broken away plan view of the stack dropping device.

DETAILED DESCRIPTION OF THE PREFERRED EMBODIMENT

Referring now to the drawings in detail, FIGS. 1 and 2 in particular, an accumulating and distributing mechanism 11, in accordance with the present invention, is depicted as a conveyor link for conveying stacks 12 of sliced meat delivered from a meat slicing machine 13 to a packaging machine 14 adapted to package the individual sliced meat stacks in packaging film, or the like.

The distributing mechanism 11 serves, in a manner subsequently described, to match the supply of sliced meat stacks 12 to the demand of the packaging machine irrespective of random fluctuations in the supply arising, for example, from inexact matching of the operating speeds of the two machines, lapses in supply when the slicing machine is reloaded with unsliced meat and the new loaf moves into slicing position, and the like. More particularly, it is to be noted that, as illustrated in FIGS. 1 and 2, the stacks 12 are spaced apart substantially an equal distance in their conveyance from the slicing machine 13 to a stack dropping device 16. This condition is representative of an unbroken flow or unifrom speed at which the stacks are delivered, by the slicing machine.

The stack dropping device 16 sequentially drops the unbroken flow of regularly spaced stacks into regularly spaced packaging pockets of a continuous packaging machine infeed conveyor translated by rollers 17 of the packaging machine. In other words, the supply of stacks matches the demand represented by the respective pockets of packaging film, and whenever a pocket is in position to receive a stack, a stack is available for dropping into the pocket. However, one or more stacks in the normally regularly spaced series thereof delivered from the slicing machine are frequently missing such that a gap exists in the flow or supply of stacks, i.e., two successive stacks may be relatively widely spaced apart compared to the relatively close spacing between the stacks when supply matches demand. As a result, there would normally be one or more pockets of the continuously moving packaging film successively positioned to receive stacks when no stacks were available for dropping. These pockets would thus be normally unfilled and packaging film would be wasted. Such situation does not exist, however, with the inventive conveyor arrangement 11, inasmuch as regularly spaced stacks are delivered from the output end thereof to the packaging machine 14, even though irregular gaps exist between the stacks at the input end supplied from the slicing machine 13.

Considering now the accmulating and distributing mechanism 11 of the present invention in more detail as to its structure and operation, same will be seen to include a pair of intermeshing conveyors 18 and 19 carried upon a horizontal structural frame 21 preferably defined by a pair of transversely spaced longitudinally extending angle iron side rails 22 interconnected by a plurality of cross members 23 (see FIG. 3), which frame is supported by a pair of longitudinally spaced stands 24.

As is illustrated, the conveyors 18 and 19 are coextensive over a greater portion of their lengths with their upper flights or reaches intersecting at a point or line of intersection referred to by the reference numeral 20. The stacks of sliced meat 12 are depositioned on the conveyor 18, the "distributor" conveyor, and travel on the upper flight thereof to the point 20 at which the conveyors intersect, whereat they are transferred because of such intersection to the upper flight of conveyor 19.

The distributor conveyor 18 includes a plurality of transversely spaced guide sprockets 26 journalled for rotation about a transverse shaft mounted at one end of the frame 21, a corresponding plurality of transversely spaced guide sprockets 27 journalled for rotation about a transverse shaft mounted adjacent the opposite end of the frame, and a corresponding plurality of continuous link chains 28, each of which pass around and engage an associated pair of sprockets 26 and 27. The chains 28 are thus transversely spaced-apart, and the upper and lower flights or reaches thereof are horizontally disposed and longitudinally extending.

The accumulator conveyor 19 similarly comprises a plurality of transversely spaced guide sprockets 29 journalled for rotation about a transverse shaft mounted adjacent the end of frame 21 near the sliding machine 13, which sprockets are in inwardly longitudinally spaced relation to sprockets 26. A corresponding plurality of transversly spaced guide sprockets 31 are journalled for rotation about a transverse shaft mounted adjacent the other end of the frame in outwardly longitudinally spaced relation to sprockets 27, and a corresponding plurality of continuous link chains 32 pass around and engage associated pairs of the sprockets 29 and 31. The result is that the accumulator conveyor chains 32 are transversely spaced-apart like the chains 28 of the distributor conveyor, and the upper and lower flights thereof are horizontally disposed and longitudinally extending.

As can be seen from FIG. 2, the accumulator conveyor sprockets 29 and 31 are transversely offset from the distributor conveyor sprockets 26 and 27 so as to dispose the distributor conveyor chains 28 between adjacent ones of the accumulator conveyor chains 32 as viewed in plan. In this regard, there may be, for example, five of the chains 32 with four of the chains 28 transversely interposed therebetween. The lower flight or reach of accumulator conveyor 19 is upwardly disposed from the lower flight of distributor conveyor 18, while the upper flight of the distributor conveyor is upwardly displaced from the upper flight of the accumulator conveyor on the input side of the intermeshing intersection 20 of the two conveyors and downwardly displaced from the upper flight of the accumulator conveyor on the output side of intersection 20. In other words, the distributor conveyor effectively terminates in the accumulator conveyor at the intermeshing intersection, and the stacks 12 are thereat delivered from the former to the latter.

As a particularly salient aspect of the present invention, means are provided to displace or more the intermeshing intersection 20 between the distributor and accumulator conveyors 18 and 19 longitudinally thereof. Thus, the point at which product is transferred from the distributor conveyor to the storage conveyor is controllable. As will be more fully understood hereinafter, upon a gap in the product flow being detected on the distributor conveyor, the point of intersection of the two conveyors can be moved in the direction of flow of the product so that when the meat stack following the gap is transferred to the storage conveyor, it is transferred thereto at a desired spacing from the previous stack, i.e., the gap is eliminated when the product is transferred to the storage conveyor. The intersection is displaceable between a normal home position 34 adjacent the input end of the conveyor arrangement and a fully actuated position 36 adjacent the output end thereof, the intersection being depicted in FIGS. 1 and 2 at a position intermediate positions 34 and 36.

Considering now the intermeshing intersection displacing means in more detail, it is to be noted that such means preferably comprise a distributor carriage 37 which establishes the intermeshing intersection 20 between the conveyors 18 and 19 and is mounted for translation longitudinally of the support frame 21 between the positions 34 and 36. More particularly, the carriage 37 preferably includes a pair of transversely spaced side plates 38 interconnected by means of vertically spaced transverse cross members 39 and 41, as best shown in FIGS. 3 and 8. A pair of longitudinally extending guide bushings 42 secured to the outer sides of plates 38 are slidable along a pair of longitudinal rails 43 mounted adjacent the opposite sides of the support frame 21. In this manner, the carriage is rendered translatable longitudinally of the frame.

A plurality of transversely spaced sprockets 44 are journalled for rotation about a shaft 46 mounted transversely between a pair of support members 47 projecting upwardly from cross member 39. These sprockets upwardly engage the distributor conveyor chains 28 in their flight between the end guide sprockets 26 and 27. In addition, a plurality of fingers 48 project longitudinally forward and downward from the cross member 39 in the direction of the output end of the conveyor arrangement 11, and these fingers are in longitudinal alignment with the sprockets 44. The projecting end of each finger is formed with a clevis 49, or the like, between the sides of which a pair of longitudinally spaced sprockets 51 and 52 are journalled for rotation about a pair of transversely mounted pins 53 and 54. In this manner, the pairs of sprockets 51 and 52 are longitudinally aligned with the sprockets 44.

The fingers 48 project downwardly between adjacent ones of a plurality of transversely spaced longitudinally extending support rails 56 which project upwardly from the base 23. The rails are of low friction material, such as Teflon, and along their upper edges support the upper reaches of the accumulator conveyor chains 32. The sets of sprockets 51 and 52 as journalled at the tips of the fingers are transversely offset from the chains supported upon the rails 56 and disposed subjacent same. Each distributor conveyor chain 28, after passing over its sprocket 44, passes over sprocket 51 and then under sprocket 52 in its flight to sprocket 27 at the output end of the conveyor arrangement. Consequently, the distributor conveyor chains 28 are caused to cross under the accumulator chains 32 at the carriage 37 to establish the intermeshing intersection 20 whereat the upper flight of the distributor conveyor passes from an elevation above the upper flight of the accumulator conveyor to an elevation below same in the direction of conveyor travel. Of course as the carriage is translated longitudinally along the rails 43, the intersection 20 or cross-under point established by the arrangement of carriage sprockets 44, 51 and 52 is correspondingly moved in the longitudinal direction.

Referring now again to FIG. 1, the distributor and accumulator conveyor arrangement 11 will be seen to also include a power drive system 57 which is coupled to the distributor and accumulator conveyors 18 and 19 to effect translation thereof in a direction from their input to output ends, and coupled to the distributor carriage 37 to effect longitudinal translation thereof in either direction. More particularly, the drive system includes a plurality of distributor conveyor drive sprockets 58 (see FIGS. 6 and 7) fixedly secured in coaxially spaced relation to a transverse shaft 59 journalled for rotation between a pair of parallel spaced side members 61 depending from the opposite sides of support frame 21, as best show in FIGS. 4 - 6. A second shaft 62 is journalled for rotation transversely between side members 61 subjacent shaft 59, and a plurality of coaxially spaced accumulator conveyor drive sprockets 63 are fixedly secured to shaft 62 in transversely offset relation to sprockets 58. In addition, a bank of individually rotatable transversely spaced entry guide sprockets 64 are journalled between the side members at a location upwardly and longitudinally spaced from the sprockets 58 in the direction of the output end of the conveyor arrangement. Entry sprockets 64 correspond in number and transverse position to both the distributor and accumulator conveyor drive sprockets 58 and 63.

A plurality of individually rotatable transversely spaced exit guide sprockets 66 are journalled between side members 61, which sprockets correspond in number and transverse position to distributor conveyor drive sprockets 58. Similarly, a plurality of individually rotatable transversely spaced exit guide sprockets 67, corresponding in number and transverse position to accumulator conveyor drive sprockets 63 are journalled between the side members. Both sets of exit guide sprockets 66 adn 67 are upwardly spaced from sprockets 58 and longitudinally spaced therefrom towards the input end of the conveyor arrangement. Exit sprockets 67 are downwardly and longitudinally spaced in the direction of the input end of the conveyor arrangement from exit sprockets 66.

The lower reaches of the distributor conveyor chains 28 engagingly extend over the entry sprockets 64, under the drive sprockets 58, and over the exit sprockets 66 in their flights from the output sprockets 27 to input sprockets 26. In a similar manner, the lower reaches of the accumulator conveyor chains 32 in their flight from output sprockets 31 to input sprockets 29 engagingly extend over entry sprockets 64, under drive sprockets 63, and over exit sprockets 67. It will be thus appreciated that driver rotation of the shafts 59 and 62 respectively carrying drive sprockets 58 and 63 effect longitudinal movement of the distributor and accumulator conveyors 18 and 19 at rates determined by the rotational speeds of the respective shafts.

In order to impart driven rotation to the distributor and accumulator conveyor drive shafts 59 and 62, the power drive system 57 includes a motor 68 carried by a support structure 69 mounted subjacent the side rails 22 of the frame 21. The motor has a rotary output shaft 71 disposed transversely of the frame 21, having a plurality of transversely spaced sprockets 72, 73 and 74 fixedly secured thereto, as best shown by FIG. 6. Sprockets 72 and 73 are of the same diameter while sprocket 74 is of twice such diameter. Sprocket 73 is coupled by means of a drive chain 76 to a sprocket 77 of the same diameter carried upon a power take-off shaft 78 journalled for rotation transversely of support structure 69. An electric clutch 79 is provided to couple the sprocket 77 to shaft 78 which is also fitted with an electric brake 81 (see FIG. 7). The clutch may, for example, be normally engaged to lock the sprocket 77 to shaft 78, and be disengaged responsive to an electrical signal to decouple the sprocket from the shaft. The brake may be normally disengaged to permit rotation of the shaft, but engaged in response to an electrical signal to prevent shaft rotation.

Sprockets 82 and 83 of equal diameters are respectively fixedly secured to take-off shaft 78 and accumulator conveyor drive shaft 62 and engaged by a chain 84 (see FIG. 5). Thus, when the clutch 79 is engaged and brake 81 is disengaged, the motor output shaft 71 drives take-off shaft 78 in a 1:1 ratio which in turn drives drive shaft 62 in a 1:1 ratio to thereby impart longitudinal movement to accumulator conveyor 19. Conversely, when the clutch is disengaged and the brake engaged, the motor output shaft is decoupled from the take-off shaft and rotation thereof is prevented to thus terminate movement of the accumulator conveyor.

The motor output sprockets 72 and 74 are coupled by means of drive chains 86 and 87 to sprockets 88 and 89, having the same diameter as sprocket 72, which are carried upon a power take-off shaft 91 journalled for rotation transversely of support structure 69, as best shown in FIG. 4 and 7. Electric clutches 92 and 93 serve to couple sprockets 88 and 89 to shaft 91 which is fitted with an electric brake 94. Equal diameter sprockets 96 and 97 are respectively fixedly secured to take-off shaft 91 and distributor conveyor drive shaft 59, and are engaged by a chain 98.

The clutches 92 and 93 and brake 94 are similar to clutch 79 and brake 81. However, clutch 92 is preferably normally engaged while clutch 93 is disengaged such that sprocket 88 is normally locked to shaft 91 and sprocket 89 is decoupled therefrom. The motor output shaft 71 then drives take-off shaft 91 in a 1:1 ratio which in turn drives drive shaft in a 1:1 ratio to impart longitudinal movement to the distributor conveyor 18 with an overall 1:1 ratio relative to the motor shaft. As a result the distributor conveyor is driven at the same speed of travel as the accumulator conveyor. However, responsive to an electrical signal applied to clutches 92 and 93, clutch 92 is disengaged and clutch 93 is engaged to decouple sprocket 88 from the take-off shaft and lock sprocket 89 thereto. Thus, the motor output shaft 71 now drives shaft 91 via chain 87 in a 1:2 ratio, an shaft 91 drives the distributor conveyor drive shaft 59 in a 1:1 ratio such that the overall ratio between the motor output shaft and conveyor drive shaft is 1:2. Hence, the distributor conveyor longitudinal speed of travel is made to be twice that of the accumulator conveyor. This arrangement therefore, acts as means for increasing the speed of the distributor conveyor when, for example, the point of intersection of the two conveyors is moved in the direction of flow of the product.

If an electrical signal is not applied to clutch 92 and clutch 93, but an electrical signal is applied to brake 94, the sprockets 88 and 89 are both decoupled from the take-off shaft 91 and the brake 94 is applied. Rotation of the take-off shaft is prevented and movement of the distributor conveyor is thus prevented.

Considering now the manner in which the power drive system 57 is effective to translate distributor carriage 37 in opposite longitudinal directions, there is provided traction chain 99 mounted on frame 21 having opposite ends secured to the opposite ends of the carriage so as to define a continuous chain loop (See FIG. 2). The chain extends about and is engaged with a pair of guide sprockets 101 and 102 journalled for rotation about transverse axes adjacent the opposite ends of frame 21. In this regard, sprocket 101 is preferably freely rotatable about the shaft carrying accumulator conveyor sprockets 29 while sprockets 102 are freely rotatable about the shaft carrying distributor conveyor sprocket 27. The lower reach of one of the traction chains 99 is guided around the lower periphery of a carriage drive sprocket 103 fixedly secured to a transverse drive shaft 104 journalled for rotation between a pair of side plates 106 depending from the opposite sides of the frame 21, as best shown in FIGS. 9 and 10. It will be thus appreciated that as viewed in the Figures, clockwise rotation of the carriage drive shaft 104 effects longitudinal translation of carriage 37 towards the left, or input end of the conveyor arrangement.

The power drive system 57 includes means for selectively rotating drive shaft 104 in the opposite direction, and in this regard such means preferably include a pair of power take-off shafts 107 and 108 which are rotatable in mutually opposite directions and selectively coupled to shaft 104 to in turn rotate same in one direction or the other depending upon which take-off shaft is coupled thereto. More particularly, shafts 107 and 108 are journalled for rotation transversely between side plates 106 with shaft 107 being subjacent shaft 104 and shaft 108 subjacent shaft 107. An input sprocket 109 fixedly secured to shaft 107 is coupled by means of an endless drive chain 111 to a sprocket 112 freely rotatable on distributor conveyor take-off shaft 91 and fixedly secured to sprocket 88 which is rigidly coupled to shaft 91 or decoupled therefrom by means of clutch 92. The sprockets 109 and 112 are of the same diameter as sprocket 88 such that a 1:1 ratio exists between the motor output shaft 71 and shaft 107 and both shafts always turn at the same speed. Shaft 107 is coupled to shaft 108 in a 1:1 ratio by means of intermeshed identical gears 113 and 114 fixedly secured to the respective shafts. Hence both shafts rotate at motor speed, but in mutually opposite directions.

A pair of sprockets 116 and 117 are carried upon carriage drive shaft 104 and selectively coupled thereto by means of electric clutches 118 and 119. Such clutches may, for example, normally decouple the sprockets 116 and 117 from the shaft, but lock the sprockets thereto in response to an applied electrical signal. Sprocket 116 is coupled in a 1:1 ratio by means of a drive chain 121 to a sprocket 122 fixedly secured to shaft 108. Thus, if clutch 118 is selectively engaged responsive to the application of an electrical signal, sprocket 116 is locked to drive shaft 104 to thereby couple shaft 107 thereto. Drive shaft 104 is thus rotated in the clockwise direction, as viewed in FIG. 10, at the speed of motor output shaft 71 to translate carriage 37 towards the output end of the conveyor arrangement 11 with the same speed of travel as accumulator conveyor 19. Conversely, if clutch 119 is engaged responsive to an electrical signal, sprocket 117 is locked to drive shaft 104 and shaft 108 is hence coupled thereto. Consequently, shaft 104 is rotated counterclockwise at the speed of motor output shaft 71 to translate carriage 37 towards the input end of the conveyor arrangement with the same speed of travel as accumulator conveyor 19.

Referring again to FIG. 1, the distributor and accumulator conveyor arrangement 11 will be seen to further include a product detection system which senses the presence or absence of the stacked meat slices 12, or other conveyed product, at various points along the conveyor arrangement and responsively controls the power drive system 57 and other components in an appropriate manner to accomplish the ends of the present invention. The product detection system includes a plurality of photoelectric detection stations 126, 127, 128 and 129 or equivalent means capable of generating electric signals when the product is at the station or absent therefrom.

Briefly, station 126 is located adjacent the stack dropping device 16 to control its operation as well as correlative actuation of accumulator conveyor 19. The stack dropping device acts as means for delivering product from the accumulator conveyor to the packaging machine 14 only when the packaging machine is ready to receive another product, i.e., when an empty packaging pocket is properly positioned below the stack dropping device to receive a stack of sliced meat.

As illustrated in FIGS. 11 – 14, the stack dropping device includes pluralities of longitudinally spaced feed rollers 131 and 132 opposite transversely projecting inward from a pair of transversely spaced longitudinal tubular shafts 133 and 134 which are rotatable about their axes. A feed motor 136 is coupled to the rollers 131 and 132 by means of an appropriate drive mechanism, portions of which are contained within the tubular shafts 133 and 134, to impart feed rotation thereto. The rollers are coextensive with accumulator conveyor 19 at its output end such that a stack 12 delivered to the end of the conveyor is supported on the rollers and fed forwardly to the detection station 126 by roller rotation. A product dropping drive motor 137 is coupled to the shafts 133 and 134 to rotate same through one quarter revolution and return when a stack is positioned at the detection station to thereby drop the stack upon the underlying packaging machine infeed conveyor translated by means of the rollers 17. The detection station 126 functions to stop rotation of feed rollers 131 and 132 in response to a stack being positioned at the detection station. An infeed conveyor microswitch, or the like, associated with the underlying packaging machine feed rollers 17 serves to signal the stack dropping device 16 that a packet of film or other receiving station is underneath the rollers 131 and 132 ready to receive a stack, whereupon the shafts 133 and 134 are responsively rotated to thereby drop the stack. When the rollers 131 and 132 have completed their rotation and are again in horizontal position, and the detection station 126 detects the absence of a stack thereat, the rollers 131 and 132 are responsively rotated and the accumulator conveyor 19 is signalled to advance and thereby deliver another stack to the rollers. In this regard, the "absence" signal is also employed to deenergize clutch 79 and brake 81, thereby engaging the clutch and disengaging the brake to initiate rotation of take-off shaft 78 and thus accumulator conveyor drive shaft 62.

The detection station 127 is located at the output end of accumulator conveyor 19 and serves to detect the presence or absence of a stack 12 thereat. When a stack is positioned at this detection station, the accumulator conveyor is signalled to stop. To this end, a "presence" signal generated from detection station 127 may be employed to energize clutch 79 for disengagement and energize brake 81 for engagement. Driving of accumulator conveyor drive shaft 62 is consequently terminated such that conveyor travel is stopped until detection station 126 generates an absence signal to restore conveyor travel and rotation of feed rollers 131 and 132 in the manner hereinbefore described.

Detecton station 128 is located at the input end of distributor conveyor 18 adjacent slicing machine 13. This detection station functions to signal the slicer to deliver a stack 12 to the distributor conveyor when a vacant space exists at its input end, and to not deliver a stack when the space is occupied by a previously delivered stack. In this connection, the slicer is desirably of the demand type, such as is described and claimed in U.S. Pat. No. 3,587,688.

Detection station 129 is carried upon the distributor carriage 37 and monitors a point on distributor conveyor 18 slightly to the input side of the intersection 20 between the distributor and accumulator conveyors. When accumulator conveyor 19 advances toward the output end of conveyor 11, distributor carriage 37 will move with it unless a stack is detected by detector station 129, in which case the distributor carriage will either remain at the home position, or if displaced from the home position, move a predetermined distance towards it. If the distributor carriage is away from the home position, the speed of travel of the distributor conveyor 18 will be doubled. It should be noted that the extremes of carriage movement defined by home position 34 and fully actuated position 36 are determined by limit switches (not shown) which are located thereat for engagement by the carriage. When either switch is engaged, movement of the carriage is responsively terminated. In this regard, switch engagement effects the disengagement of clutches 118 and 119 to thereby decouple power from carriage drive shaft 114. It is particularly important to note that engagement of the home limit switch is also effective to cause the distributor conveyor 18 to travel at normal speed, i.e., the speed of accumulator conveyor 19.

Briefly, in operation, the speed in which the slicer produces stacks of sliced meat, and the speed with which the packaging machine is capable of receiving such stacks, are chosen to be generally the same. However, in view of the invention, no interlocking arrangement is needed to exactly match such speeds.

Sliced stacks of meat are dropped from the slicer 13 onto the distributor conveyor 18 under the control of detection station 128. That is, whenever the detection station 128 indicates the absence of a stack at the input end of the conveyor, it signals the slicer to drop a new stack. Because stacks are being removed from the distributor conveyor at generally the same rate as they are being added thereto, this results in more or less continuous movement of such distributor conveyor.

The stacks of meat are transported by the distributor conveyor to the intersection 20 thereof with the accumulator conveyor, whereat they are transferred to the latter. Movement of the accumulator conveyor is controlled by detection station 127 which assures that a stack of meat is at the output end of such accumulator for transfer to the stack dropping device whenever such is required. Again, because the speeds of the slicer and the packaging machine are generally the same, the result is that the accumulator conveyor is more or less continuously in motion.

If there is a gap in product flow, i.e., the slicer does not deliver a stack to the distributor conveyor at a proper time when it is instructed to do so by the detection station 128, the detection station 129 senses the absence of a stack during a movement of the accumulator conveyor 19. This causes the distributor carriage to move away from home position 34 and follow the last stack on the accumulator conveyor. When the stack following the gap is transferred between the conveyors, it will be transferred to the accumulator conveyor at a location immediately following the last stack prior to the gap. In view of the drive ratios and sprocket sizes discussed above, the speed of movement of the carriage 37 will be equal to the speed of movement of the accumulator conveyor.

The detection system 129 signals not only movement of carriage 37 upon sensing a gap, but also signals the drive system to double the speed of distributor conveyor 18. The result is that the speed of movement of the intersection in a direction toward home position 34 is compensated for by a corresponding increase in the speed of the distributor conveyor.

Upon the transfer of a stack from the distributor conveyor to a point on the accumulator conveyor correcting for the gap, the detection station 129 commands the drive system to reverse the direction of motion of the carriage 37 and cause it to move toward position 34 a distance sufficient to place it immediately behind the last stack transferred. It will thus be positioned to correct for the next gap in product flow.

While the invention has been described in connection with a preferred embodiment thereof, it will be appreciated that various changes and modifications can be made without departing from its spirit. It is therefore intended that the protection on the invention be limited only by the claims and their equivalents.

I claim:

1. An accumulating and distributing mechanism for correcting for random fluctuations in the delivery of objects by an object, supplying mechanism to an object demanding mechanism, comprising a pair of intersecting conveyors for transporting a plurality of said objects successively between said supplying mechanism and said demanding mechanism with a first one of said conveyors positioned to receive said objects from said supplying mechanism and deliver them to the second one of said conveyors at the point of intersection of said conveyors, means for detecting a spacing between successive ones of said objects on said first conveyor which is greater than a predetermined desired spacing therebetween, and means responsive to the detection of said greater spacing by moving said point at which said first and second conveyors intersect in the direction of flow of said objects to a new location relative to said second conveyor at which the next object transferred from said first conveyor to said second conveyor is positioned on said second conveyor at a desired spacing from the preceding object thereon, irrespective of said greater spacing on said first conveyor.

2. The accumulating and distributing mechanism of claim 1 further including means for detecting when said object demanding mechanism is ready to have one of said objects delivered thereto, and means intermediate said second conveyor and said object demanding mechanism responsive to said second detection means by delivering an object from said second conveyor to said demanding mechanism only when said object demanding mechanism is ready to receive an object.

3. The accumulating and distributing mechanism of claim 2 wherein means are provided at the input end of said first conveyor for indicating when said first conveyor is positioned to receive objects from said object supplying mechanism and for signaling said object supplying mechanism of this fact.

4. The accumulating and distributing mechanism of claim 1 wherein means are provided responsive to the transference of said next object to said second conveyor at said new location by returning said point of intersection to a position immediately following the object transferred.

5. The accumulating and distributing mechanism of claim 4 wherein means are also provided responsive to said detection of said greater spacing by increasing the speed of said first conveyor relative to the speed of said second conveyor to hasten the transportation of said next object to said point of intersection for transference to said second conveyor.

6. The accumulating and distributing mechanism of claim 5 wherein said first and second conveyors are coextensive with one another over a selected portion of their lengths with the upper, object carrying flight of one positioned above the upper flight of the other for a selected distance and then passes through said upper flight of the other to provide said point of intersection of said two conveyors and a continuous flow path for said objects from one of said conveyors to the other, wherein said means for moving said point of intersection does so by moving the location at which the upper flight of said one conveyor passes through the upper flight of the other along said coextensive portion of their lengths, and wherein said means for increasing the speed of said first conveyor relative to the second conveyor does so by an amount at least compensating for the speed of movement of said point of intersection along said second conveyor.

7. The accumulating and distributing mechanism of claim 6 wherein said means for moving said point of intersection is a carriage mounted for movement along said coextensive lengths of said conveyors, said carriage having conveyor guides moveable therewith defining the path of the upper flight of said one conveyor through the upper flight of the other.

8. The accumulating and distributing mechanism of claim 7 further including means for detecting when said object demanding mechanism is ready to have one of said objects delivered thereto, and means intermediate said second conveyor and said object demanding mechanism responsive to said detection means by delivering an object from said second conveyor to said demanding mechanism only when said object demanding mechanism is ready to receive an object.

9. The accumulating and distributing mechanism of claim 7 wherein means are provided at the input end of said first conveyor for indicating when said first conveyor is positioned to receive objects from said object supplying mechanism and for signalling said object suppling mechanism of this fact.

10. The accumulating and distributing mechanism of claim 7 wherein said object supplying mechanism is a food slicer and said object demanding mechanism is a machine for packaging food slices, and wherein a detection station is situated at the input end of said first conveyor for indicating when said first conveyor is ready to receive food slices from said slicer and for signaling said slicer to deliver food slices thereto, a detection station is included at the end of said second conveyor for detecting when said packaging machine is ready to have food slices delivered thereto for packaging, and a food stack dropping device is positioned intermediate said end of said conveyor and said packaging machine for delivering sliced food from said second conveyor to said packaging machine only when said packaging machine is ready to receive said food slices.

* * * * *